Sept. 25, 1945.   O. VON ZELEWSKY ET AL   2,385,430
LATHE FOR PROFILING HOLLOW BODIES
Filed Feb. 4, 1943   5 Sheets-Sheet 1

Inventors
Ottomar von Zelewsky,
and Karl Künzi,
by Sommers + Young
Attorneys

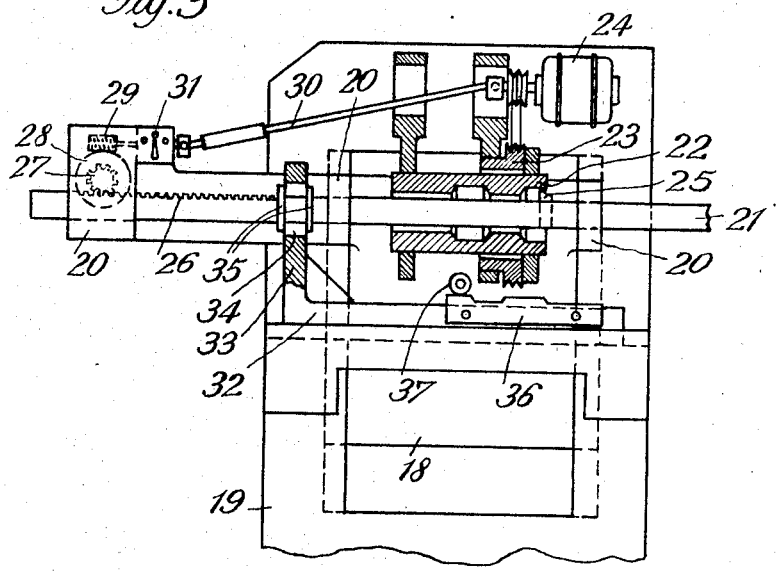
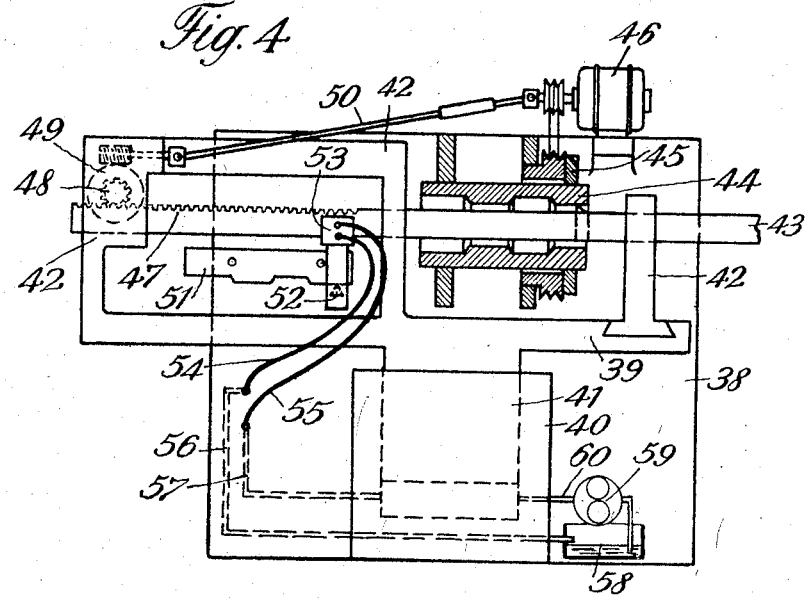

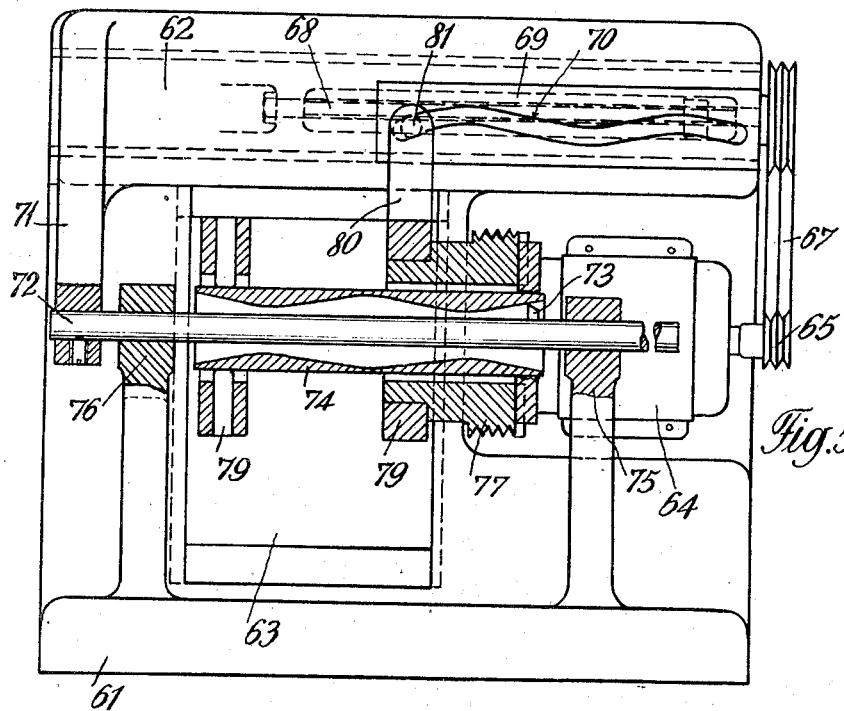
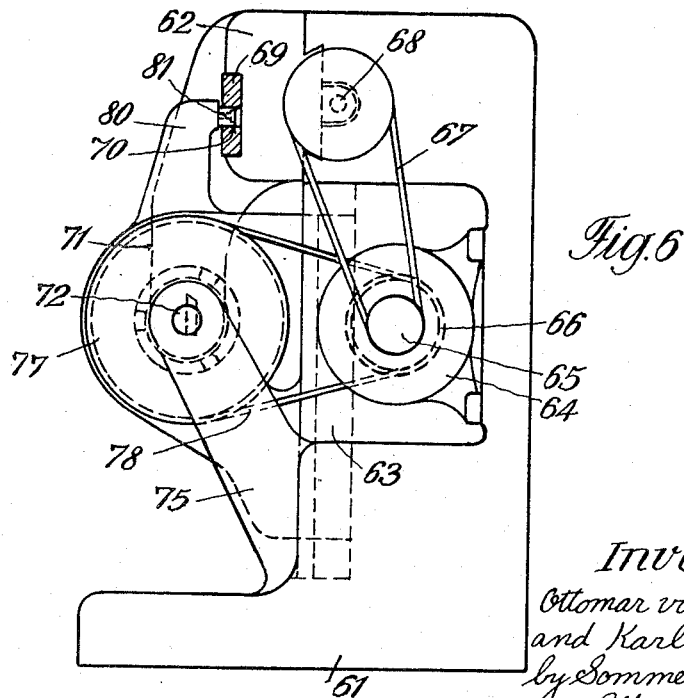

Patented Sept. 25, 1945

2,385,430

UNITED STATES PATENT OFFICE 2,385,430

LATHE FOR PROFILING HOLLOW BODIES

Ottomar von Zelewsky, Neuhausen, and Karl Künzi, Schaffhausen, Switzerland, assignors to Aktiengesellschaft der Eisen- und Stahlwerke vormals Georg Fischer, Schaffhausen, Switzerland Application February 4, 1943, Serial No. 474,714
In Switzerland November 15, 1941

1 Claim. (Cl. 77—3)

Lathes for profiling the interior of hollow bodies are known in which a tool holder is used which is guided on both sides of the blank and is longitudinally displaceable along guides. In these known constructions the control of the cross travel is obtained by designing the guides of the tool holder as cross slides movable transversely to the axis of the lathe, said movement being controlled by suitable means.

In one of the known lathes the tool holder is mounted with a spherical seat in the slides the cross movements of the latter being controlled by guide curves (templates) displaceable in the longitudinal direction. The templates are coupled with a bed slide provided on the machine frame which moreover is connected to the tool holder by means of an articulated joint. Owing to this articulated connection between bed slide and tool holder the longitudinal movements of the tool holder and of the templates, which control the two cross slides, do not exactly correspond with each other, so that in producing the templates according to the working drawing of the blank to be machined a correction has to be made which is undesirable and causes considerable additional costs. A further disadvantage of this construction consists in the fact that the tool holder is subjected to bending stresses in the positions of the cross slides in which the articulated rod connecting the tool holder to the bed slide forms an angle with the latter. The spherical mounting of the tool holder enhances its deflection under the working pressure of the turning tool.

In another known machine the cross-movement of the slide carrying the tool holder is effected by means of members to which a swinging movement is imparted by suitable means. Furthermore a straight edge is provided for the purpose of varying the stroke of the swinging movement and thereby the extent of the cross-movement of the slides. Also in these constructions the tool holder rests with a spherical seat in the slides.

Further it is known to use a cantilevered tool holder rigidly clamped to the support. The cantilevered tool holder is rigidly clamped on a cross-slide which is carried by a bed slide guided on the machine frame, a longitudinal movement being imparted to said bed slide by suitable means. The movements of the cross slide are controlled by means of a controlling device consisting of a template and of a feeler, one of these parts being arranged on the cross slide and the other on the machine frame. The cantilevered mounting of the tool holder permits only a short length of machining of blanks of small diameters owing to oscillations of the tool holder occurring at greater lengths.

The present invention has reference to a lathe for profiling the interior of hollow-bodies, in which the tool holder is guided at both sides of the blank and is longitudinally displaceable in guides. According to the invention a template is provided to control the relative movement between tool holder and blank.

A cross slide controlled by the template may carry the tool holder or the blank.

On the cross slide displaceably arranged on the machine frame the guides of the tool holder may be supported whereby the cross slide together with the guides and the tool holder is controlled in the transverse direction by the controlling device consisting of the template and the feeler, one part of which carries out a longitudinal movement with the same speed as the tool holder. A spherical mounting of the tool holder in the guides is done away with, whereby an increased rigidity of the tool holder results. The shape of the template corresponds exactly to the profile of the blank to be produced, so that its manufacture is simplified.

The template which is fixed to a slide carrying out a longitudinal movement and connected to the tool holder may control the movements of the cross slide which carries the rotating blank. The interior profile of the hollow body is produced by the cooperation of the longitudinal movement of the tool holder and the cross movement of the blank. The mutual dependency of the longitudinal and the cross movements is warranted by the copying device, as one part of the latter is connected with the longitudinally movable tool holder and the other part with the transversely movable slide for the blank.

Several constructional examples of lathes according to the invention are illustrated on the accompanying drawings, in which Fig. 1 shows a machine partly in front elevation and partly in section;

Fig. 3 shows a second constructional example of the machine in front elevation and partly in section;

Fig. 4 shows a third constructional example in the same manner;

Fig. 5 shows a fourth constructional example in the same manner;

Fig. 6 is a side view of the lathe shown in Fig. 5;

Figure 1:
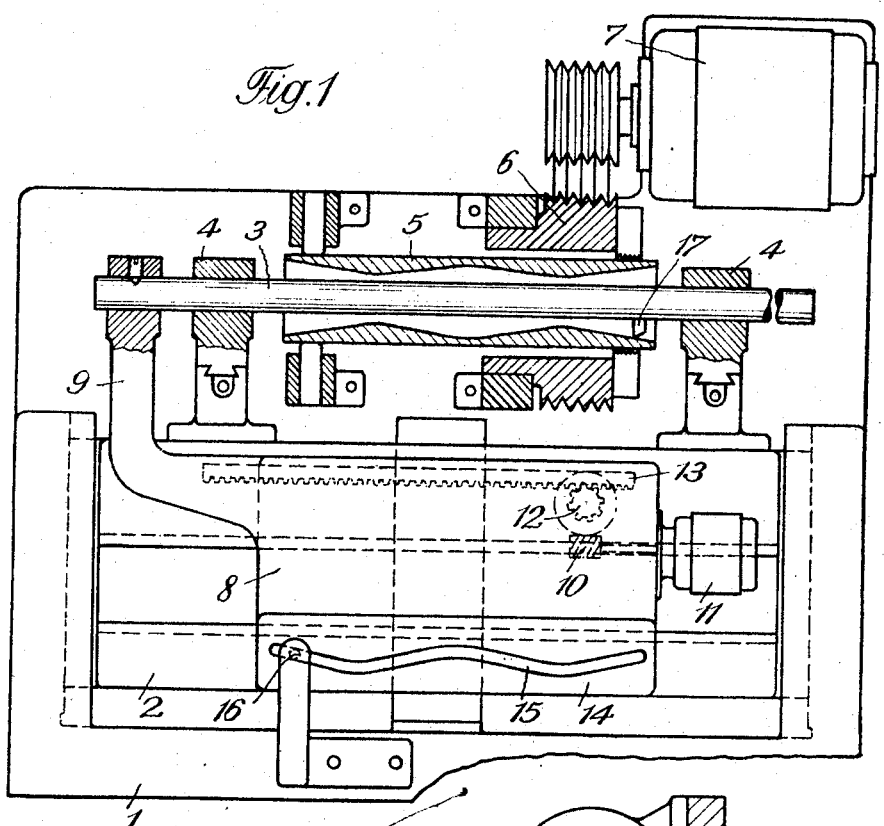
Figure 2:
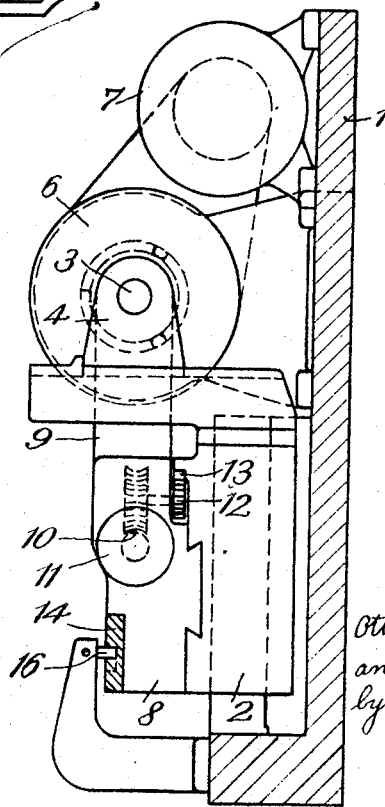
Fig. 2 is an end view of the machine with parts shown in section.

Referring now to the drawings 1 (Figs. 1 and 2) denotes the machine frame on which the vertically arranged cross slide 2 is guided. On its upper side the cross slide 2 carries guides 4 for the tool holder 3 which are arranged at either side of the blank 5. The blank 5 is fixed in the chuck 6 turnably arranged on the machine frame 1 and driven by an electric motor 7. The cross slide 2 carries a longitudinal slide 8 the upwardly extending arm 9 of which is coupled with the tool holder 3. A worm gear 10 provided on the longitudinal slide 8 is driven by an electric motor 11. To the shaft of the worm wheel a pinion 12 is fixed meshing with a toothed rack 13 fixed to the cross slide 2. The longitudinal slide 8 carries an exchangeable template 14 with the curved slot 15 with which a feeler 16 cooperates. A longitudinal displacement of the longitudinal slide 8 causes by the cooperation of the template 14 and the feeler 16 a movement of the cross slide 2 in the transverse direction. The guides 4 and the tool holder 3 take part in this transverse movement and the tool holder 3 moreover partakes in the longitudinal movements of the slide 8. The tool 17 fixed to the tool holder 3 carries out a movement which is determined by the shape of the slot 15 of the template 14.

In the constructional example of the lathe illustrated in Fig. 3 18 denotes a cross slide, adapted to be vertically displaceable on the machine frame, and which supports guides 20 for the tool holder 21. 22 designates the blank fixed in the chuck 23. The chuck 23 is turnably mounted in the machine frame 19 and is rotated by an electric motor 24. The tool 25 is fixed in the tool holder 21 which is secured against rotation. One end of the tool holder 21 is shaped as a toothed rack 26. A pinion 27 cooperates with the rack 26 and is fixed to the shaft of a worm wheel 28. The latter is driven by a worm 29 which in its turn is driven by an electric motor 24 through the intermediary of a telescoping shaft 30 having universal joints. A change speed gear box 31 is arranged in front of the worm gear 28, 29 in order to vary the speed of the longitudinal movement of the tool holder 21. Pinion 27, worm gear 28, 29 and gear box 31 are supported by the cross slide 18. A longitudinal slide 32 is guided on the machine frame 19. An upwardly extending arm 33 of the longitudinal slide 32 is provided with a vertical slot 34 in which the tool holder 21 is guided in the vertical direction. By means of the collars 35 provided on the tool holder 21 and bearing against both sides of the arm 37 the slide 32 is caused to take part in the longitudinal movement of the tool holder. A template 36 is fixed on the longitudinal slide 32. A feeler 37 formed as a roller and carried by the cross slide 18 bears against the template.

The constructional example illustrated in Fig. 4 shows a vertically displaceable cross slide 39 arranged on the machine frame 38 and carried by a piston 41 guided in a cylinder 40 of the machine frame. The cross slide 39 carries the guides 42 of the tool holder 43. 44 designates the blank held in the chuck 45. The latter is turnably arranged on the machine frame and is driven by an electric motor 46. One end of the tool holder 43 is formed as a toothed rack 47 with which a pinion 48 meshes. The latter is driven by a worm gear 49 carried by the cross slide 39. The drive of the worm gear is effected by said motor 46 by the intermediary of a telescopic shaft 50 having universal joints. A template 51 is fixed to the machine frame 38 and a feeler 52 cooperates with the template. The feeler 52 actuates a member 53 fixed to the tool holder 43 and controlling the flow of pressure liquid. The member 53 is connected by means of hoses 54 and 55 to pipes 56 and 57. The pipe 56 is connected to a tank 58 and the tube 57 is connected to the part of the cylinder 40 below the piston 41. A pressure pump sucks liquid from the tank 58 and forces it under pressure through a conduit 60 below the piston 41 into the cylinder 40.

In the constructional example illustrated in Figs. 5 and 6 61 denotes the machine frame, 62 the longitudinal slide, 63 the cross slide and 64 the motor as driving means. On the two ends of the shaft of the motor 64 belt pulleys 65 and 66 are arranged. The belt pulley 65 drives by means of the belts 67 the screw spindle 68 which displaces the longitudinal slide 62. On the latter the template 69 is fixed having a guide curve 70 which corresponds to the desired inner profile of the blank. The arm 71 at the end of the longitudinal slide 62 forces the tool holder 72 to follow the longitudinal movements of the template 69. The turning tool 73 is fixed in the tool holder 72. To either side of the blank 74 the bearings 75 and 76 for the tool holder 72 are arranged. The blank 74 is held in a chuck 77 and is rotated by the motor 64 i. e. by its belt pulley 66 and belt 78. The bearing 79 of the chuck 77 and of the blank 74 are carried by the cross slide 63. An arm 80 which is rigidly connected to the cross slide 63 carries a roller 81 which rolls along the guide curve 70 of the template 69. An ascending portion of the guide curve 70 causes a rising and a descending portion of the guide curve 70 a lowering of the cross slide 63 and of the blank 74. To the longitudinal movements of the tool holder 72 and to the action of the template correspond the varying bore diameters which are caused by the lifting and lowering movements of the cross slide 63.

Figure 7:
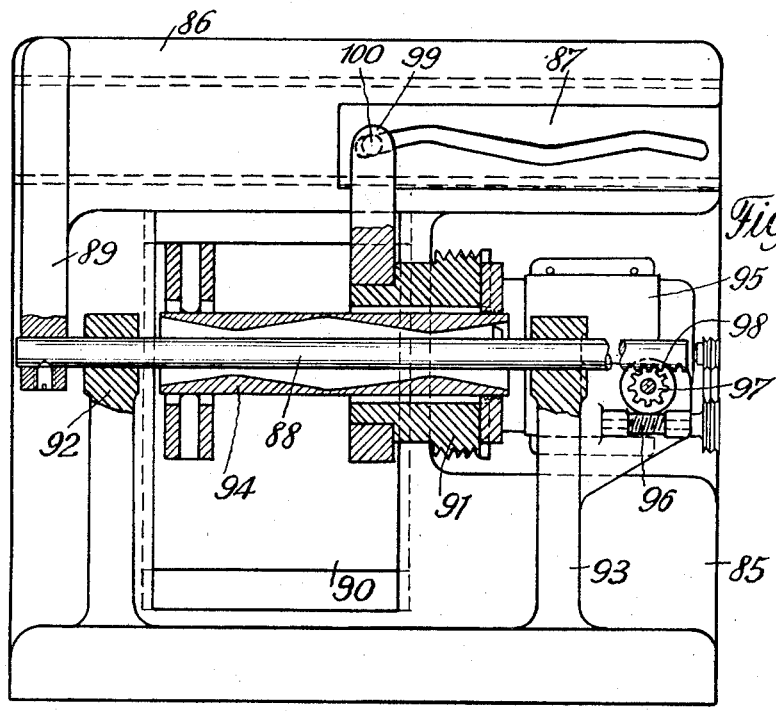
Figs. 7 and 8 illustrate a fifth constructional example in front elevation and side view respectively and Figs. 9 and 10 a sixth constructional example in front elevation and side view respectively.
Figure 8:
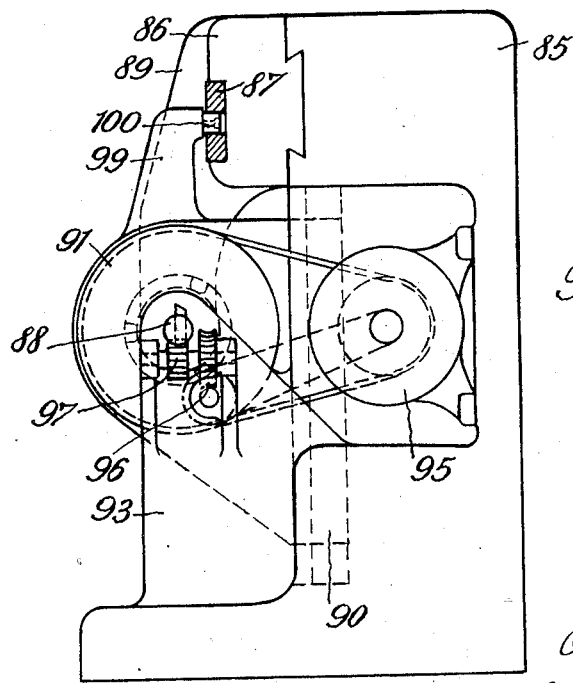

A lathe of a similar design is shown in Figs. 7 and 8. On the machine frame 85 is mounted the longitudinal slide 86 carrying the template 87 and connected with the tool holder 88 by the arm 89, and the cross slide 90 supporting the chuck 91. The tool holder 88 is supported at both sides of the blank 94 by means of the bearings 92 and 93. The blank 94 held in the chuck 91 is rotated with the latter by the motor 95. The latter drives through a gear 96 the gear wheel 97 which meshes with the rack 98 on the steel holder 88. In this manner longitudinal movement is imparted to the tool holder 88 during the turning. The tool holder 88, by means of arm 89 causes the longitudinal slide 86 and the template 87 fixed to the latter to partake in its movement. By means of the arm 99 supported on the cross slide 90 or the roller 100 fixed to said arm respectively the template 87 controls the movement of the cross slide 90 and thereby of the blank 94 supported by said slide.

Figure 9:
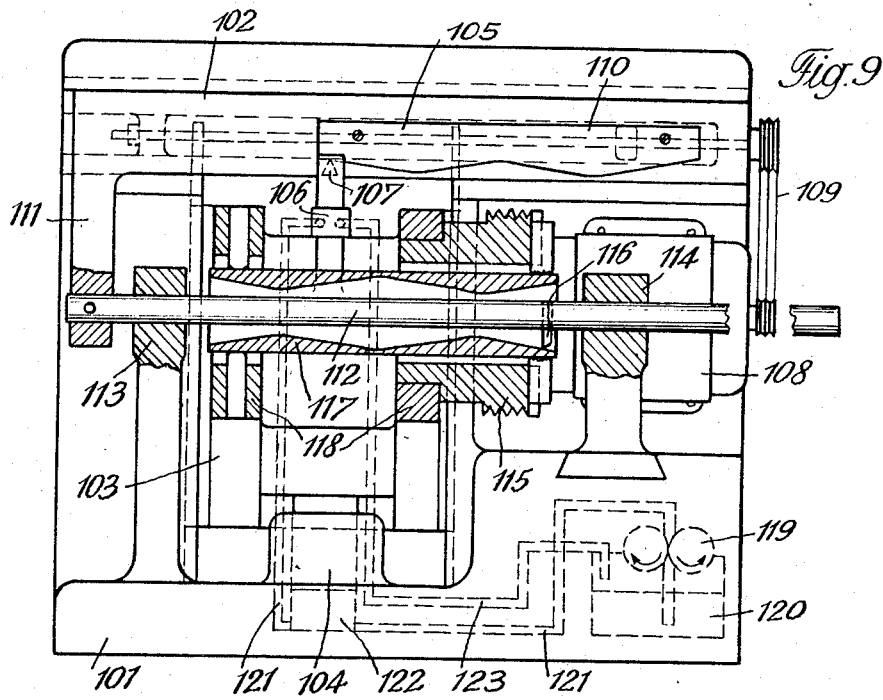
Figure 10:
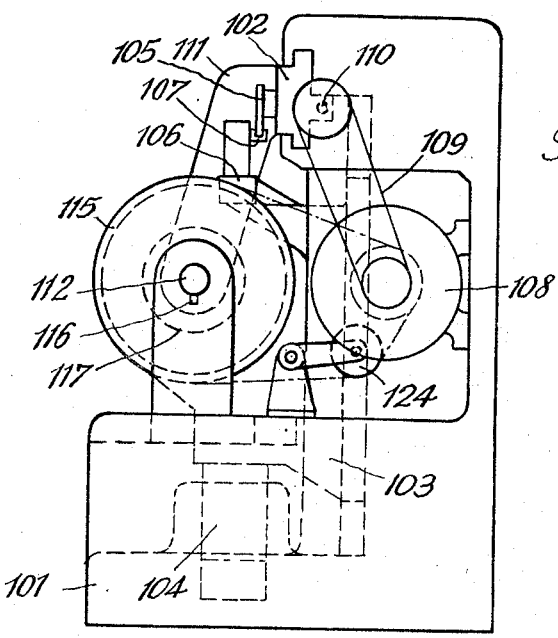

Figs. 9 and 10 illustrate a further constructional example. The machine frame 101 serves as a support to the longitudinal slide 102 and to the vertically movable cross slide 103. The latter is carried by a hydraulic piston 104 the lifting and lowering movements of which are controlled by means of a feeler 107 cooperating with the template 105 and actuating a member 106 controlling the flow of the pressure liquid. The motor 108 drives a screw threaded spindle 110 by means of a belt 109, the horizontal displacement of the longitudinal slide 102 being caused by the said spindle. The template 105, which is mounted on the longitudinal slide 102, takes part in this horizontal displacement movement. The arm 111 provided on the longitudinal slide 102 serves as driver to the tool holder 112 which is guided in the two bearings 113 and 114. The bearing 114 is removable to permit the actuation of the chuck 115 when clamping or releasing the blank. The turning tool 116 is for example shown pointing in the downward direction in Fig. 9. In any of the afore described exemplifications the possibility exists to arrange the turning tool pointing upwardly by a suitable arrangement of template and feeler. The blank 117, the chuck 115 and the two bearings 118 are supported on the cross slide 103. The motor 108 imparts also rotation to the chuck 115 and the blank 117 held therein, so that the drive effecting the longitudinal movement of the steel holder 112 and the drive causing the rotating movement of the chuck 115 and of the blank is obtained by a driving member common to both drives. The hydraulic controlling arrangement comprises a pump 119, and the oil tank 120, a pressure conduit 121 leading to the pressure space 122 below the piston 104 and from there to the controlling member 106. The illustrated hydraulic controlling arrangement operates in the manner well known with pressure regulation of copying machine tools by means of a pressure relief edge actuated by the feeler 107 and permitting pressure liquid to flow into the return conduit 123 in accordance with the position of the feeler.

Any other arrangement for controlling the pressure liquid or any other copying method working pneumatically or electrically may be employed with such lathes for profiling the interior of hollow bodies according to the invention.

In Fig. 10 124 denotes a tension roller for compensating the variation in length of the driving means occurring when the cross slide is displaced. However the motor 108 may also be displaced by suitable means.

We claim:

In a lathe for profiling the interior of hollow bodies, in combination, a machine frame, a cross slide guided on said machine frame, a tool holder, guide means arranged on said cross slide and adapted to guide said tool holder in the longitudinal direction, said guide means being arranged adjacent either side of a hollow body to be profiled and being fixed against pivotal movement, a controlling device comprising a template and a feeler cooperating with said template, and adapted to control the transverse movements of said cross slide, and means adapted to impart longitudinal movement to the tool holder and also to impart to one of the two parts of said controlling device a movement in the longitudinal direction at the same speed as the tool holder.

OTTOMAR VON ZELEWSKY.
KARL KÜNZI.